United States Patent [19]

Cheng

[11] Patent Number: 4,830,579
[45] Date of Patent: May 16, 1989

[54] PORTABLE COMPRESSOR KIT WITH DETACHABLE LAMP

[75] Inventor: Se L. Cheng, Duarte, Calif.

[73] Assignee: Alltrade, Inc., City of Commerce, Calif.

[21] Appl. No.: 170,834

[22] Filed: Mar. 21, 1988

[51] Int. Cl.$^4$ ............................................. F04B 35/04
[52] U.S. Cl. ...................................... 417/234; 73/431; 206/573; 367/154; 367/225; 367/285; 417/313; 417/411
[58] Field of Search ................. 206/573, 223; 73/431, 73/37; 417/234, 411, 313, 44, 33; 362/154, 156, 225, 226, 258, 285

[56] References Cited

U.S. PATENT DOCUMENTS

| | | | |
|---|---|---|---|
| 1,432,297 | 10/1922 | Metternich | 362/156 |
| 3,938,132 | 2/1976 | Cunningham | 362/154 X |
| 3,963,972 | 6/1976 | Todd | 362/183 X |
| 4,187,058 | 2/1980 | Fish | 417/234 |
| 4,241,385 | 12/1980 | Asano | 362/258 |
| 4,375,162 | 3/1983 | Eppley | 73/431 X |
| 4,389,166 | 6/1983 | Harvey et al. | 417/234 |
| 4,621,984 | 11/1986 | Fussell | 417/234 |
| 4,751,620 | 6/1988 | Wright et al. | 362/154 X |
| 4,776,766 | 10/1988 | Brent | 417/44 |
| 4,789,310 | 12/1988 | Hung | 417/234 |

Primary Examiner—Bryon P. Gehman
Attorney, Agent, or Firm—Edgar W. Averill, Jr.

[57] ABSTRACT

An improved portable compressor kit for use with motor vehicles including a detachable light. The compressor kit has an electrical cord which is plugged into the cigarette lighter socket of a vehicle. The case is wired so that it supplies electricity to the compressor held by the case and also to a light held by the case. The light may be unplugged from its connection with the case as may be the conductor which leads from the cigarette lighter socket, and this conductor may then be plugged into the removable light to provide a portable light.

10 Claims, 2 Drawing Sheets

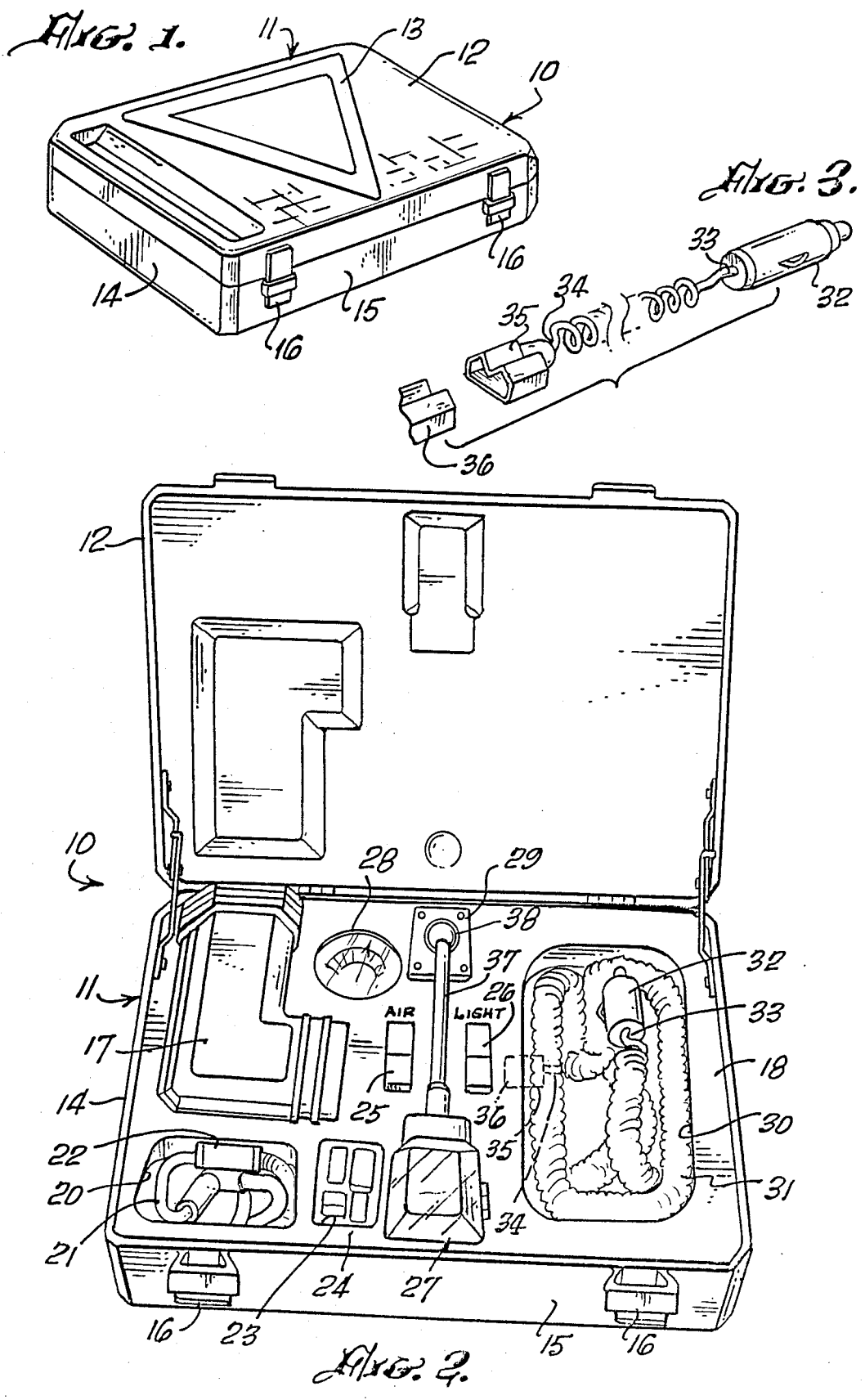

4,830,579

PORTABLE COMPRESSOR KIT WITH DETACHABLE LAMP

BACKGROUND OF THE INVENTION

The field of the invention is automobile accessories and the invention relates more particularly to portable compressors useful for inflating automobile tires and other inflatable objects.

Portable 12 volt air compressors which connect to the cigarette lighter of a vehicle have become useful accessories for inflating automobile and bicycle tires as well as toys, air shocks and other inflatable objects. Often the need for such portable compressors arises at night on a highway and the concomitant need for a light arises. Unfortunately, flashlights kept in vehicle trunks often contain batteries which have become discharged over time and numerous accidents occur because of the hazard presented by the changing or inflation of a tire on a poorly lit highway.

SUMMARY OF THE INVENTION

It is an object of the present invention to provide an improved portable compressor kit which includes a light which may be detached and energized by an electrical cord plugged into the cigarette lighter socket of the vehicle.

The present invention is for an improved portable compressor kit for use with motor vehicles. The kit is of the type having an air compressor in a case and the air compressor is energized by the storage battery of the vehicle. The kit is of the type which includes an electrically-driven air compressor, an electrical cord including a plug adapted to be plugged into the cigarette lighter of a vehicle and an air hose including a fitting attachable to the air valve of a tire. The improvement comprises a light fixture connector held by the case and the light fixture connector is electrically connected to the electrical cord which is plugged into the cigarette lighter socket. A portable light fixture is removably affixed to the light fixture connector and a removable connector is also affixed to the case end of the electrical cord. The removable connector of the electrical cord is affixed to the case by a case connector and when the removable connector is removed from the case, it can be connected to the light connector of the portable light which is also removable from its connector held by the case. Preferably, the light fixture connector may be pivoted upwardly so that it may be held in a highly visible position by the case for safety lighting. The light, being powered by the storage battery of the vehicle, may readily provide sufficient illumination, and its portability provides illumination in any preferred area.

BRIEF DESCRIPTION OF THE DRAWINGS

FIG. 1 is a perspective view showing the top, front and left side of the case of the improved portable compressor kit of the present invention.

FIG. 2 is an enlarged perspective view showing the case of FIG. 1 in an open configuration.

FIG. 3 is an exploded perspective view of the electrical cord, cigarette lighter plug and cord connector and case connector of the case 11.

DESCRIPTION OF THE PREFERRED EMBODIMENTS

Figure 4:
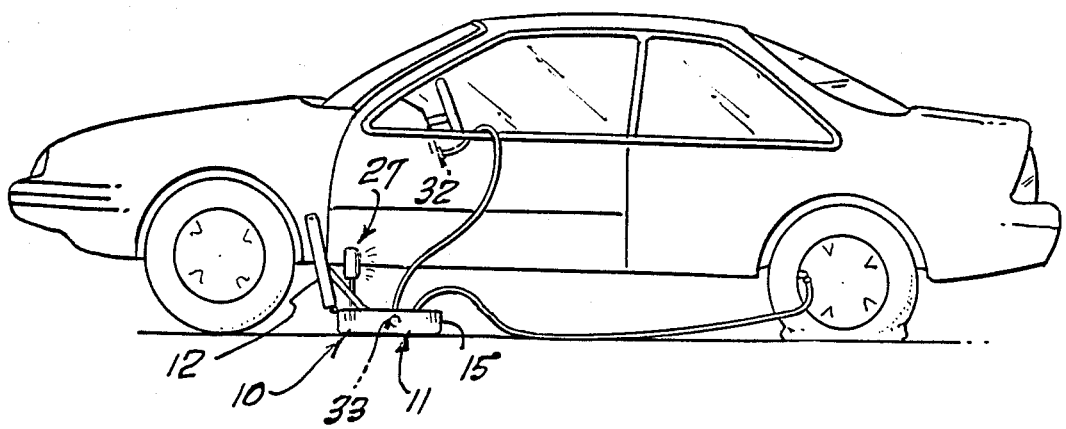
FIG. 4 is a side view of a motor vehicle having a flat tire being inflated with the portable compressor kit of the present invention.

The improved portable compressor kit of the present invention is shown in a closed configuration in FIG. 1 and indicated generally by reference character 10. Kit 10 has a case 11 which includes a top 12 with a reflective tape triangle 13. Case 11 has a left side 14 and a front 15 with a pair of latches 16.

Kit 10 is shown with the case open in FIG. 2 where it can be seen that an electrically-driven air compressor 17 is held in a recess in tray 18. Tray 18 also has a recess 20 to hold an air hose 21 which, in turn, has a fitting 22 for attachment to a tire valve. A smaller recess 23 holds fittings generally indicated by reference character 24 which may be affixed to air hose 21 for the inflation of air rafts, footballs, basketballs and the like.

An electrical switch 25 turns on the air compressor when the case has been energized. Similarly, light switch 26 turns on a portable light fixture 27 as described in more detail below. A pressure gauge 28 is also held by tray 18, as is the base 29 which holds light fixture 27. Tray 18 also has a large recess 30 for an electrical cord 31 which has a cigarette lighter plug 32 which is adapted to fit into the cigarette lighter socket of a vehicle. Electrical cord 31 is preferably a spiral cord which helps prevent it from becoming tangled during storage and also provides a neat connection between the vehicle and the case. Electrical cord 31 has a plug end 33 and a case end 34. A cord connector 35 is affixed to the case end 34 and may be removably connected or disconnected to a case connector 36 which is held by tray 18. When cigarette lighter plug 32 is inserted into a cigarette lighter socket and cord connector 35 is connected to case connector 36, the electrical system of the case becomes energized.

Figure 5:
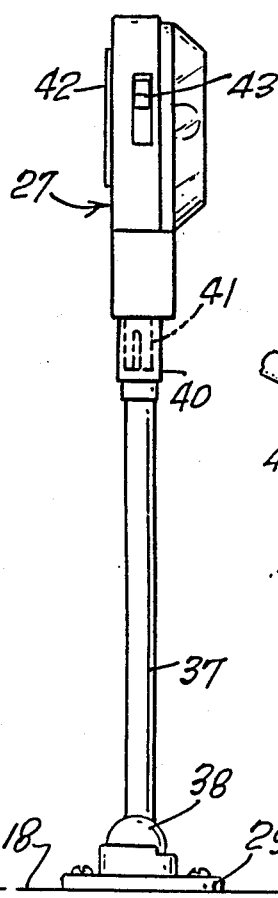
FIG. 5 is an enlarged side view of the light of the case of FIG. 1.
Figure 6:
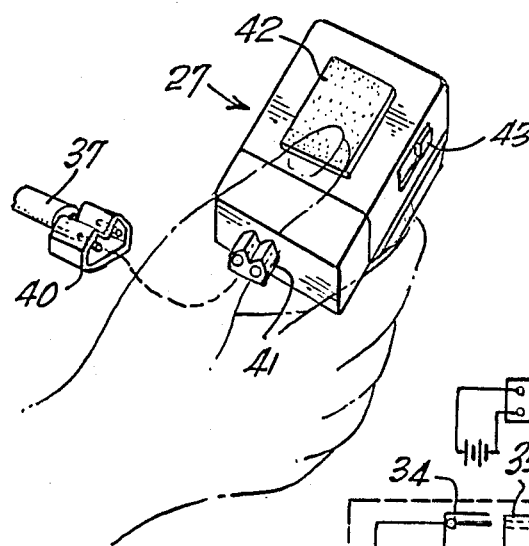
FIG. 6 is a perspective view showing the removable light of FIG. 4 in a removed configuration.

The portable light fixture 27 is shown in a vertical position in FIG. 5. Portable light fixture 27 is removably connected to a rod 37 which, in turn, is affixed to ball 38. Ball 38 is held in a socket 39 affixed to base 29. This provides a frictional, pivotal connection so that rod 38 may be pivoted upwardly from its position, as shown in FIG. 2, to a vertical position as shown in FIGS. 4 and 5.

While light fixture 27 is useful in its vertical position, as shown in FIGS. 4 and 5, it has a further benefit achieved by the removal of light fixture 27 from rod 37. A rod connector 40, which is of the pin and socket type, is held at the upper end of rod 37. Rod connector 40 removably holds light connector 41 which is held at the base of portable light fixture 27. Thus, in order to use light fixture 27 in a preferred location, one need merely disconnect cord connector 35 from case connector 36 and insert cord connector 35 into light connector 41. In this way, the light may be moved, for instance, to the trunk of the vehicle, the motor compartment or other area to provide a bright, 12 volt light source at a desired location. A magnet 42 and a light switch 43 may be further added to facilitate the use of removable light fixture 27. Further enhancements, such as a rechargeable battery, a light flashing circuit or a colored lens would provide additional flexibility to the kit of the present invention.

Figure 7:
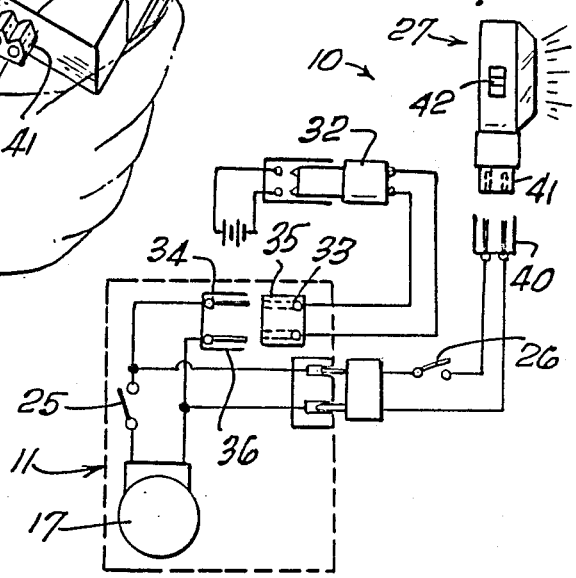
FIG. 7 is a circuit diagram of the improved portable compressor kit of FIG. 1.

A circuit diagram is shown in FIG. 7 where it can be seen that the air compressor and light fixture can be readily operated from the case with the only exposed wiring being the connection through electrical cord 31.

While rod 37 has been shown as a solid pivotable rod, other methods might be used such as a telescoping rod with a spiralled wire therein. While a pin and socket type of connector has been shown in the drawings, many other types of connectors could also be used. The exposed end of cord 31 should, of course, be protected from electrical shorting upon contact with a metal surface. Rod 37 should thus be a movable rod so that light fixture 27 may be moved into a retracted position so that the case may be closed and also moved into a visible position when the case is open.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. An improved portable compressor kit for use with motor vehicles, said kit being of the type having an air compressor held in a case, said air compressor being energized by the storage battery of the vehicle and which kit includes, in addition to an electrically-driven air compressor, an electrical cord including a plug adapted to be plugged into a cigarette lighter socket of a vehicle, said cord having a plug end and a case end, an air hose including a fitting attachable to the air valve of a tire, wherein the improvement comprises:
   a light fixture connector held by said case, said light fixture connector being electrically connected to said electrical cord;
   a portable light fixture, removably affixed to said light fixture connector held by said case, said light fixture including a bulb and reflector and said light fixture including a light connector with which said light fixture connector is removably connected;
   a removable connector affixed to the case end of the electrical cord; and
   a case connector adapted to receive said removable connector of said electrical cord, said removable connector affixed to the case end of the electrical cord and said light fixture connector both being connectable with the light connector of said portable light fixture to make an electrical connection whereby said portable light fixture may be operated as attached to the light fixture connector held by the case or may be detached therefrom and operated by attachment to the removable connector affixed to the case end of the electrical cord when it has been removed from the case connector.

2. The improved portable compressor kit of claim 1 wherein said light fixture connector held by said case is located on the end of a movable arm so that the light fixture may be elevated from said case and operated.

3. The improved portable compressor kit of claim 2 wherein said movable arm is a rod which is hingedly held by said case and is pivoted from a generally horizontal position to a generally vertical position.

4. The improved portable compressor kit of claim 1 wherein said light fixture connector held by said case, into which said light fixture is plugged, and said light connector are pin and socket type connectors.

5. The improved portable compressor kit of claim 1 further including a light switch held by said case and positioned between said case connector and said light fixture connector held by said case.

6. An improved portable compressor kit for use with motor vehicles, said kit being of the type having an air compressor held in a case, said air compressor being operated by the storage battery of the vehicle and which kit includes, in addition to an electrically-driven air compressor, an electrical cord including a plug adapted to be plugged into a cigarette lighter socket of a vehicle, said cord having a plug end and a case end, an air hose including a fitting attachable to the air valve of a tire, wherein the improvement comprises:
   a light fixture connector held by said case and movable therefrom, said light fixture connector being electrically connected to said electrical cord;
   a portable light fixture removably affixed to said light fixture connector held by said case, said light fixture including a bulb and reflector and said light fixture including a light connector with which said light fixture connector is removably connected;
   a removable connector affixed to the case end of the electrical cord; and
   a case connector adapted to receive said removable connector of said electrical cord, said removable connector affixed to the case end of the electrical cord and said light fixture connector both being connectable with the light connector of said portable light fixture to make an electrical connection whereby said portable light fixture may be operated as attached to the light fixture connector held by the case or may be detached therefrom and operated by attachment to the removable connector affixed to the case end of the electrical cord when it has been removed from the case connector.

7. The improved portable compressor kit of claim 6 wherein said light fixture connector is affixed to the end of a rod pivotally and frictionally attached to the case, the length of the rod being sufficiently short so that the case may be closed when the rod is pivoted down to the surface of the case.

8. The improved portable compressor kit of claim 7 wherein said pivotal connection is a ball and socket connection.

9. The improved portable compressor kit of claim 6 wherein said light fixture further includes a rechargeable battery.

10. The improved portable compressor kit of claim 6 wherein said light fixture further includes a magnet affixed thereto.

* * * * *